United States Patent
Itoda

(10) Patent No.: US 11,943,298 B2
(45) Date of Patent: Mar. 26, 2024

(54) VEHICULAR COMMUNICATION DEVICE

(71) Applicant: DENSO CORPORATION, Kariya (JP)

(72) Inventor: Shuhei Itoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 496 days.

(21) Appl. No.: 17/189,461

(22) Filed: Mar. 2, 2021

(65) Prior Publication Data

US 2021/0185129 A1 Jun. 17, 2021

Related U.S. Application Data

(63) Continuation of application No. PCT/JP2019/027460, filed on Jul. 11, 2019.

(30) Foreign Application Priority Data

Sep. 5, 2018 (JP) .................................. 2018-166105

(51) Int. Cl.
*H04L 12/26* (2006.01)
*H04J 3/06* (2006.01)
*H04L 67/12* (2022.01)

(52) U.S. Cl.
CPC ................ *H04L 67/12* (2013.01); *H04J 3/06* (2013.01)

(58) Field of Classification Search
None
See application file for complete search history.

(56) References Cited

U.S. PATENT DOCUMENTS

| | | | |
|---|---|---|---|
| 2011/0255427 A1* | 10/2011 | Diab ....................... | H04L 43/50 370/252 |
| 2014/0022912 A1* | 1/2014 | Kim ....................... | H04L 49/555 370/244 |
| 2014/0047158 A1* | 2/2014 | Frans ..................... | G06F 3/0658 711/102 |
| 2016/0253524 A1 | 9/2016 | Sugawara | |
| 2019/0229948 A1 | 7/2019 | Iwata et al. | |

FOREIGN PATENT DOCUMENTS

| | | |
|---|---|---|
| JP | 5976220 B2 | 8/2016 |
| JP | 2018056679 A | 4/2018 |

* cited by examiner

*Primary Examiner* — Zewdu A Beyen
(74) *Attorney, Agent, or Firm* — Harness, Dickey & Pierce, P.L.C.

(57) ABSTRACT

A vehicular communication device is configured to perform communication in accordance with an Ethernet standard, and includes a medium access controller (MAC), a clock monitor, and a return processor. The MAC is configured to execute medium access control. The clock monitor is configured to monitor a clock signal for operating the MAC. The return processer is configured to restart a clock output source that outputs the clock signal, in response to the clock monitor detecting that the clock signal is stopped.

9 Claims, 7 Drawing Sheets

VEHICULAR COMMUNICATION DEVICE

CROSS REFERENCE TO RELATED APPLICATIONS

The present application is a continuation application of International Patent Application No. PCT/JP2019/027460 filed on Jul. 11, 2019, which designated the U.S. and claims the benefit of priority from Japanese Patent Application No. 2018-166105 filed on Sep. 5, 2018. The entire disclosures of all of the above applications are incorporated herein by reference.

TECHNICAL FIELD

The present disclosure relates to a vehicular communication device.

BACKGROUND

Conventionally, Ethernet (registered trademark) communication networks have been widely used in offices and homes. Further, in recent years, the introduction of Ethernet has been progressing in vehicles from the viewpoint of improving communication speed and the like.

SUMMARY

The present disclosure provides a vehicular communication device configured to perform communication in accordance with an Ethernet standard, and including a medium access controller (MAC), a clock monitor, and a return processor. The MAC is configured to execute medium access control. The clock monitor is configured to monitor a clock signal for operating the MAC. The return processer is configured to restart a clock output source that outputs the clock signal, in response to the clock monitor detecting that the clock signal is stopped.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
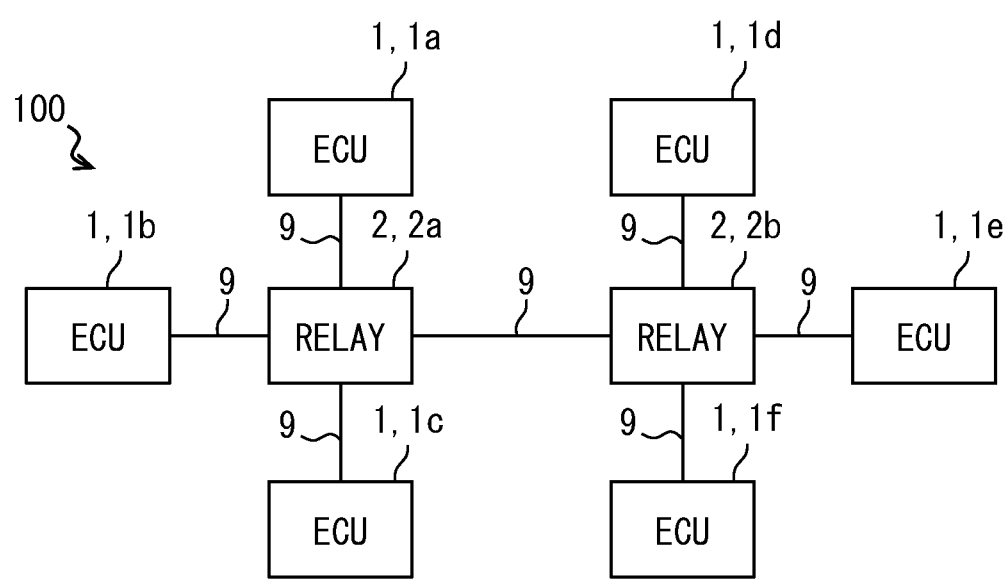
FIG. 1 is a diagram showing a schematic configuration of an in-vehicle communication system.

In general, a device having a function of performing communication conforming to an Ethernet standard (hereinafter, a communication device) includes a physical layer (PHY) and a medium access controller (MAC) that executes medium access control. In general, a communication device includes a plurality of PHYs and a plurality of MACs corresponding to the PHYs, respectively.

The MAC operates based on a clock signal input from the PHY or the like. For example, when the PHY and the MAC are configured to communicate by media independent interface (MII), the MAC transmits and receives data with the PHY connected to the MAC based on the clock signal input from the PHY. Further, in reduced MII (RIII), the MAC transmits and receives data with the PHY using a reference clock signal output by a clock generator prepared separately from the PHY. The communication device here includes an information processing device such as a computer in addition to a router and a switch.

Hereinafter, for convenience, a configuration that outputs the clock signal used for the MAC to transmit and receive data with the PHY, such as the PHY in MII and the clock generator in RMII, is referred to as a clock output source. Further, a signal line through which the clock signal used for the MAC to transmit and receive data with the PHY is referred to as a clock line.

In a communication device, an external noise superimposed on a communication cable may cause a fault in the clock output source, a phenomenon in which the clock line connected to the clock output source is fixed at a certain level (hereinafter, clock fixing phenomenon) may occur. In particular, since there are many noise sources such as actuators in vehicles, noise is more likely to be superimposed on a communication cable than in offices, schools, homes or the like (hereinafter, offices or the like). Therefore, in a communication device used in a vehicle (that is, a vehicular communication device), the above-described clock fixing phenomenon is more likely to occur than in a general communication device used in offices or the like. The vehicular communication device is, for example, an electronic control unit (hereinafter referred to as an ECU). In addition, relay devices such as a router and a switching hub are also included in vehicular communication devices.

When a clock fixing phenomenon occurs in the vehicular communication device, the MAC connected to the clock line where the clock fixing phenomenon occurs can no longer transmit data to the PHY or receive data output from the PHY. Accordingly, the vehicular communication device can no longer transmit and receive data with other communication devices via the MAC.

On the other hand, there are some combinations of in-vehicle ECUs that should share information in real time from the viewpoint of safety. Therefore, there is a demand for releasing the clock fixing phenomenon in vehicular communication devices as soon as possible.

In the case of a communication device used in offices or the like (that is, a communication device for the general public), even if a fault occurs due to the clock fixing phenomenon, a user can take measures, such as restarting the communication device manually, for example, by pressing a power button for a long time. However, in-vehicle communication devices such as an ECU and a relay device are stored inside vehicles and are not configured to be easily operated by a user such as a driver.

A vehicular communication device according to an aspect of the present disclosure is configured to perform communication in accordance with an Ethernet standard, and includes a medium access controller (MAC), a clock monitor, and a return processor. The MAC is configured to execute medium access control. The clock monitor is configured to monitor a clock signal for operating the MAC. The return processer is configured to restart a clock output source that outputs the clock signal, in response to the clock monitor detecting that the clock signal is stopped.

According to the above configuration, when the clock signal for operating the MAC is fixed, the clock monitor detects a stop of the clock signal, and the return processor restarts the clock output source. When the clock signal is stopped, it is assumed that the clock output source has a fault due to external noise superimposed on a communication cable. Therefore, restarting the clock output source will release the fixing of a clock line. That is, according to the above configuration, the fixing of the clock signal for operating the MAC can be automatically released.

Embodiments of the present disclosure will be described below with reference to the drawings. FIG. 1 is a diagram showing a configuration example of an in-vehicle communication system 100 according to the present disclosure. The in-vehicle communication system 100 is a communication system built in a vehicle. The in-vehicle communication system 100 according to the present embodiment is configured according to the in-vehicle Ethernet standard. Hereinafter, data communication in accordance with the Ethernet communication protocol is referred to as Ethernet communication. Further, hereinafter, a communication frame refers to a communication frame in accordance with the Ethernet communication protocol (so-called Ethernet frame).

The in-vehicle communication system 100 includes at least one relay device 2 and a plurality of electronic control units (ECUs) 2 as nodes. The in-vehicle communication system 100 shown in FIG. 1 includes six ECUs 1 and two relay devices (RELAY) 2 as an example. When distinguishing each of the two relay devices 2 from the other, the two relay devices 2 are described as relay devices 2a and 2b. Further, when distinguishing each of the six ECUs 1 from the others, the six ECUs 1 are described as ECUs 1a to 1f.

The ECUs 1a to 1c are connected to the relay device 2a via communication cables 9, respectively, so as to be able to communicate with each other. The ECUs 1d to 1f are connected to the relay device 2b via communication cables 9, respectively, so as to be able to communicate with each other. The relay device 2a and the relay device 2b are also connected to each other via a communication cable 9 so as to be able to communicate with each other. The communication cables 9 may be twisted pair cables.

The number of ECUs 1 and relay devices 2 constituting the in-vehicle communication system 100 is an example, and can be changed as appropriate. Further, the network topology of the in-vehicle communication system 100 shown in FIG. 1 is an example and is not limited thereto. The network topology of the in-vehicle communication system 100 may be a mesh type, a star type, a bus type, a ring type, or the like. The network shape can also be changed as appropriate.

As described above, the ECUs 1 are connected to the relay devices 2 via the communication cables 9. The plurality of ECUs 1 provide different functions. For example, the ECU 1a is an ECU that provides an autonomous driving function (so-called autonomous driving ECU). The ECU 1b is an ECU that acquires a program for updating a software of an ECU by wirelessly communicating with an external server and updates the software of the ECU to which the program is applied. The ECU 1c is an ECU that provides a function as a gateway when the in-vehicle communication system 100 is connected to an external tool by wire. The external tool here refers to a tool for updating or rewriting the software of a target ECU by wired communication (so-called reprogramming tool) or a diagnostic tool. The relay devices 2 can be connected with the ECUs 1 that provide various functions as nodes.

Each of the ECUs 1 performs transmission and reception of data with another ECU 1 via the relay device 2 according to the Ethernet communication protocol. Each of the ECUs 1 directly communicates only with the relay device 2. Nodes connected to the relay device 2 may be nodes other than the ECU 1, such as a sensor. The node may be an external tool capable of dynamically changing the connection state to the in-vehicle communication system 100 by a user or an inspector. The relay device 2 can also correspond to a node from another point of view. For example, for the relay device 2a, the relay device 2b corresponds to one of the nodes connected to the relay device 2a. Each of the ECUs 1 and each of the relay devices 2 are assigned with unique identification information. The identification information includes a MAC address.

Figure 2:
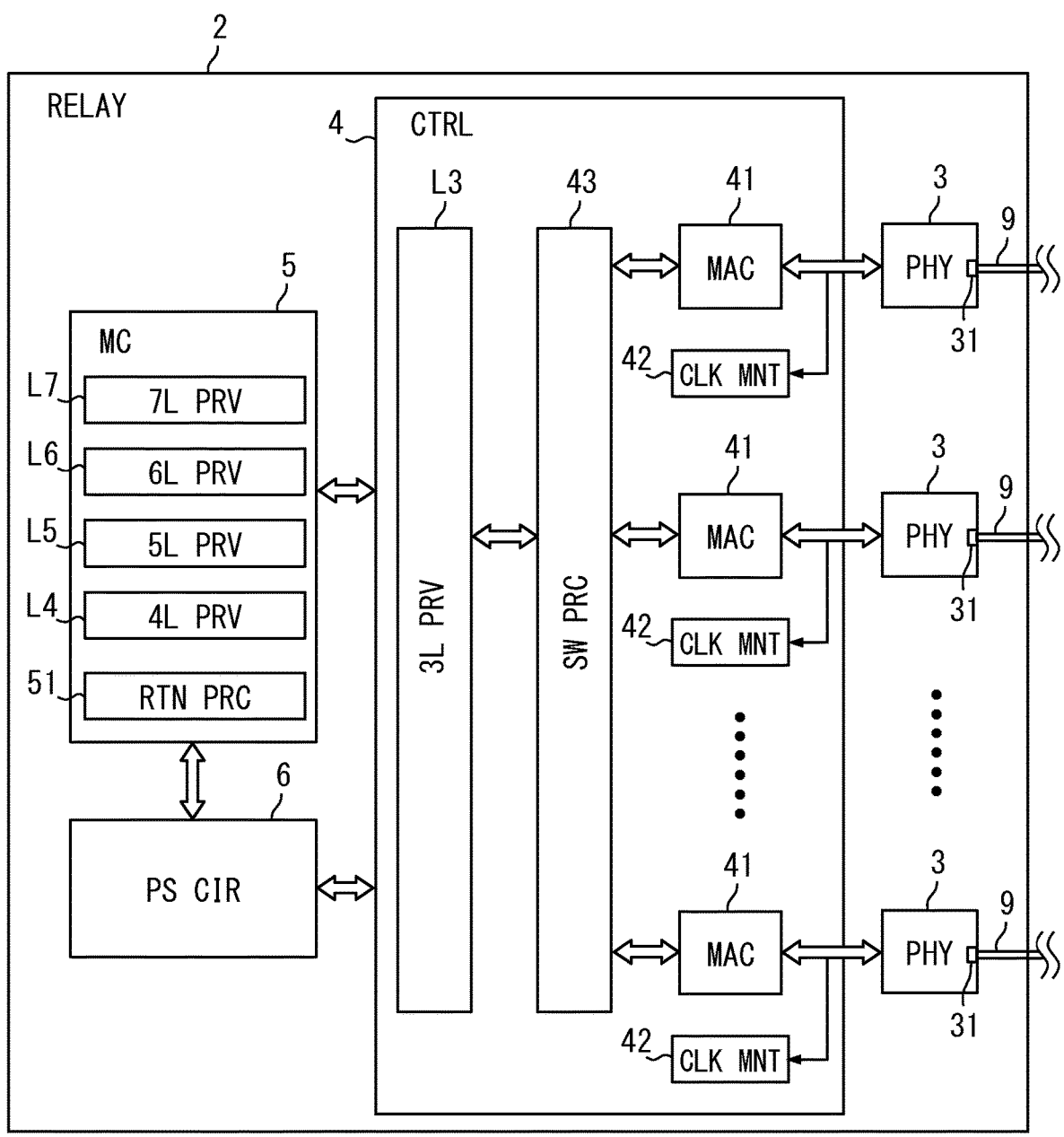
FIG. 2 is a block diagram showing a configuration of a relay device.

Each of the relay devices 2 is a device that transmits a communication frame received from a certain communication cable 9 to a communication cable 9 according to the destination of the communication frame. As shown in FIG. 2, each of the relay devices 2 includes a plurality of PHYs 3, a controller (CTRL) 4, and a microcomputer (MC) 5, and a power supply circuit (PS CIR) 6.

Each of the PHYs 3 is connected to the communication cable 9 and provides a physical layer in the OSI reference model. Each of the PHYs 3 includes a port 31 electrically connected to the communication cable 9. In the present embodiment, as an example, one communication cable 9 is connected to one PHY 3. That is, each of the PHYs 3 includes one port 31 to be connected with one of the communication cables 9.

For example, one PHY 3 included in the relay device 2a is connected to the ECU 1a via the communication cable 9, and another PHY 3 included in the relay device 2a is connected to the ECU 1b via the communication cable 9. In addition, the relay device 2a includes a PHY 3 connected to the ECU 1c via the communication cable 9, a PHY 3 connected to the relay device 2b via the communication cable 9.

The number of PHYs 3 included in the relay device 2 corresponds to the number of nodes to which the relay device 2 can be connected. As an example, the relay device 2 of the present embodiment includes six PHYs 3 so as to enable Ethernet communication with six nodes at the maximum. As another configuration, the number of PHYs 3 included in the relay device 2 may be four or eight. Further, each of the PHYs 3 may include a plurality of ports 31. For example, each of the PHYs 3 may have two ports 31.

A unique port number is set for each of the plurality of ports 31 included in the relay device 2. For convenience, when the plurality of ports 31 included in the relay device 2 are distinguished, each of the ports 31 is described as the Kth port using the port number K set to each of the ports 31. For example, a first port refers to the port 31 whose port number is set to 1, and a second port refers to the port 31 whose port number is set to 2.

Generally, the PHY 3 converts the signal input from the connected communication cable 9 (hereinafter, the connection cable) into a digital signal that can be processed by the controller 4, and outputs the digital signal to the controller 4 (specifically, a MAC 41). Further, the PHY 3 converts the digital signal input from the controller 4 into an analog signal, which is an electric signal capable of being transmitted to the communication cable 9, and outputs the converted signal to a predetermined communication cable 9.

In addition to the above-described signal conversion, the PHY 3 also performs frame coding, serial-parallel conversion, signal waveform conversion, and the like. The PHY 3 is an integrated circuit (IC) including an analog circuit, that is, a hardware circuit. Each of the PHYs 3 and the controller 4 (specifically, MAC 41) are configured to communicate with each other according to an MII standard, as will be described later.

The controller 4 is connected to each of the PHYs 3 and is also connected to the microcomputer 5 so as to be able to communicate with each other. The controller 4 is programmed to execute functions of a second layer (data link layer) to a third layer (so-called network layer) in the OSI reference model. The controller 4 includes a plurality of MAC 41s, a plurality of clock monitors (CL MNT) 42, a switch processor (SW PRC) 43, and a third layer provider (3L PRV) L3 as functional blocks. Each of the MACs 41 performs medium access control in the Ethernet communication protocol. The MACs 41 are prepared for the PHYs 3, respectively. That is, the number of MACs 41 are the same as the number of the PHYs 3. The MAC 41s are connected to different one of the PHYs 3.

Each of the MACs 41 provides the switch processor 43 with a communication frame (hereinafter, also referred to as a reception frame) input from the PHY 3 connected to each of the MACs 41. In addition, each of the MACs 41 outputs the communication frame input from the switch processor 43 to the PHY 3 corresponding to each of the MACs 41, and transmits the communication frame to the communication cable 9. Each of the MACs 41 performs carrier sense multiple access/collision detection (CSMA/CD) cooperatively with the corresponding PHY 3. Each of the MACs 41 may be configured to provide the functions specified by IEEE 802.3.

Each of the clock monitors 42 is configured to monitor the clock signal input from the PHY 3 to the MAC 41. The clock monitor 42 is prepare for every MAC 41 (in other words, every PHY 3), for example. That is, the controller 4 includes the plurality of clock monitors 42 so as to correspond to the respective MACs 41/PHYs 3. The details of the clock monitors 42 will be described later.

The switch processor 43 identifies the PHY 3 (strictly speaking, the port 31) to which the communication frame received from the MAC 41 is to be transmitted based on the destination MAC address and an address table included in the communication frame. Then, the reception frame is relayed by outputting the communication frame to the MAC 41 corresponding to the identified PHY 3. The address table is data indicating the MAC address of the node connected to each PHY 3 (strictly speaking, each port 31). The MAC address for each PHY 3 is learned by various methods such as learning bridge and address resolution protocol (ARP). A detailed description of the method of generating the address table will be omitted. The controller 4 may be provided with the function of learning the MAC address of the connection destination for each PHY 3 (hereinafter, the address table update function), or the microcomputer 5 may be provided with the address table update function.

The third layer provider performs relay processing using an internet protocol (IP) address. In other words, the third layer provider relays communication frames between different networks. The function of the third layer in the OSI reference model may be provided in the microcomputer 5. The functional arrangement in the relay device 2 can be changed as appropriate.

The controller is realized by using, for example, a field-programmable gate array (FPGA). The controller 4 may be realized by using an application specific integrated circuit (ASIC). Further, the controller 4 may be realized by using a microprocessor unit (MPU), a central processing unit (CPU), or a graphical processing unit (GPU). The controller 4 having the above-described functions corresponds to a configuration that operates as a switch (in other words, a switching hub) or a router.

The microcomputer 5 is a computer including a CPU, a read only memory (ROM), a random access memory (RAM), an input-output part (I/O), and a bus line for connecting these components. The ROM stores a program for causing a general-purpose computer to function as the microcomputer 5. The microcomputer 5 provides the functions from a fourth layer to a seventh layer of the OSI reference model by the CPU executing the program stored in the ROM while using the temporary storage function of the RAM.

That is, the microcomputer 5 includes a fourth layer provider (4L PRV) L4, a fifth layer provider (5L PRV) L5, a sixth layer provider (6L PRV) L6, and a seventh layer provider (7L PRV) L7 corresponding to each layer from the fourth layer to the seventh layer. The fourth layer provider L4 is configured to execute a process as the fourth layer (that is, a transport layer), and executes inter-program communication, data transfer guarantee, and the like. The fifth layer provider L5 is configured to execute a process as the fifth layer (that is, a session layer). The sixth layer provider L6 is configured to execute a process as the sixth layer (that is, a presentation layer). The seventh layer provider L7 is configured to execute a process as the seventh layer (that is, an application layer). Such a configuration corresponds to a configuration in which the fourth to seventh layers are realized by software processing. The storage medium for storing the program executed by the CPU is not limited to the ROM but may be stored in a non-transitional substantive recording medium.

Figure 3:
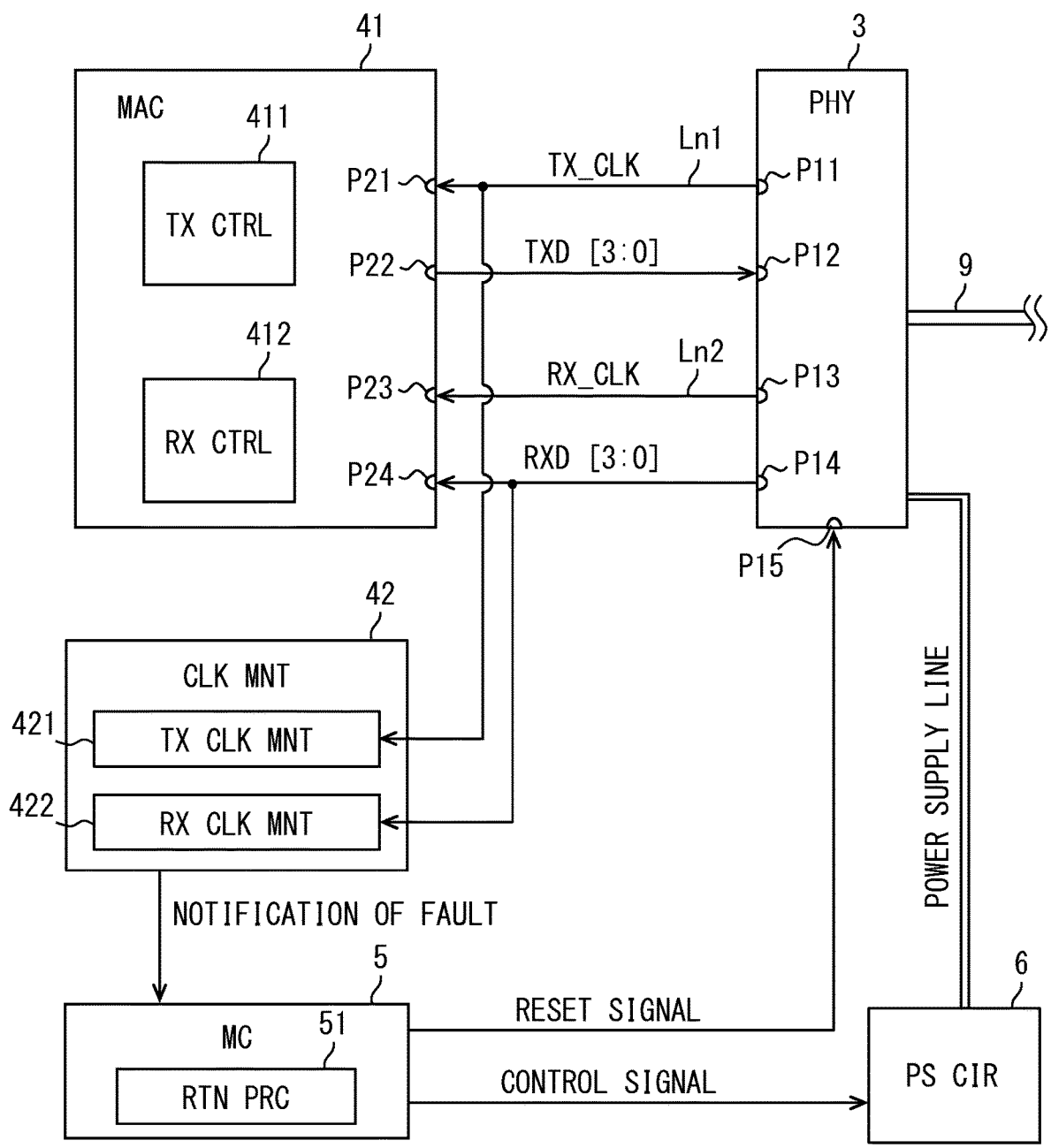
FIG. 3 is a diagram for explaining the operation of a clock monitor and a return processor.

Further, as shown separately in FIG. 3, the microcomputer 5 includes a return processor (RTN PRC) 51. The return processor 51 executes a predetermined clock fixing releasing process based on the notification from the clock monitor 42. The details of the operation of the return processor 51 will be described later.

Next, the configuration and operation of the clock monitor 42 will be described with reference to FIG. 3. The MAC 41 of the present embodiment is configured to transmit and receive data by the PHY 3 and MII. That is, the PHY 3 includes a transmission clock output terminal P11, a transmission data input terminal P12, a reception clock output terminal P13, and a reception data output terminal P14. Further, the MAC 41 includes a transmission clock input terminal P21, a transmission data output terminal P22, a reception clock input terminal P23, and a reception data input terminal P24. The MAC 41 further includes a transmission controller (TX CTRL) 411 and a reception controller (RX CTRL) 412 as a configuration for performing communication by MII. The PHY 3 further includes a reset input terminal P15.

The transmission clock output terminal P11 is connected to the transmission clock input terminal P21 by a signal line, and the transmission data input terminal P12 is connected to the transmission data output terminal P22 by a signal line. The reception clock output terminal P13 is connected to the reception clock input terminal P23 by a signal line, and the reception data output terminal P14 is connected to the reception data input terminal P24 by a signal line. For convenience, the signal line connecting the transmission clock output terminal P11 and the transmission clock input terminal P21 is referred to as a transmission clock line Ln1. Further, the signal line connecting the reception clock output terminal P13 and the reception clock input terminal P23 is referred to as the reception clock line Ln2.

The MAC 41 further includes a terminal for outputting a transmission enable signal, a terminal for receiving a signal indicating that valid reception data is being received, and the like (both are not shown). Further, the MAC 41 may be provided with terminals for inputting or outputting various signals such as an input terminal for a carrier detection signal and an input terminal for a collision detection signal.

When the PHY 3 is operating normally, the PHY 3 sequentially outputs a transmission clock signal (TX_CLK) of a predetermined frequency (for example, 25 MHz) from the transmission clock output terminal P11. The transmission clock signal output from the transmission clock output terminal P11 is input to the transmission clock input terminal P21 of the MAC 41. The transmission clock signal is a clock for operating the transmission controller 411 of the MAC 41.

The transmission controller 411 is configured to execute a process for outputting the communication frame input from the switch processor 43 to the PHY 3. Based on the transmission clock signal being inputted, the transmission controller 411 outputs a data constituting the communication frame input from the switch processor 43 to the PHY 3 by 4 bits at a time. TXD shown in FIG. 3 represents 4-bit transmission data. The transmission data is output from the transmission data output terminal P22 of the MAC 41 and input to the transmission data input terminal P12 of the PHY 3. The transmission data input to the PHY 3 is subjected to processing such as modulation by a transmission circuit (not shown) and transmitted to the communication cable 9.

When the transmission clock signal is stopped, the transmission controller 411 stops operating. Therefore, when the output of the transmission clock output terminal P11 of a certain PHY 3 is fixed at a certain level (for example, a high level or a low level), the relay device 2 can no longer output a data to another communication device connected to the PHY 3.

Further, when the PHY 3 is operating normally, the PHY 3 sequentially outputs a reception clock signal (RX_CLK) of a predetermined frequency (for example, 25 MHz) from the reception clock output terminal P13. The reception clock signal output from the reception clock output terminal P13 is input to the reception clock input terminal P23 of the MAC 41. The reception clock signal is a clock for operating the reception controller 412 of the MAC 41. Further, the PHY 3 receives a data input from the communication cable 9 and outputs the data from the received data output terminal P14 by 4 bits at a time. A reception data (RXD) output from the reception data output terminal P14 is input to the reception data input terminal P24 of the MAC 41.

The reception controller 412 of the MAC 41 is configured to execute a process for outputting the reception data provided from the PHY 3 to the switch processor 43. Based on the reception clock signal being inputted, the reception controller 412 operates and acquires the data input to the reception data input terminal P24. When the reception clock signal is stopped, the reception controller 412 stops operating. Therefore, when the reception clock signal is stopped, the reception controller 412 does not receive the data even if the reception data is output from the reception data output terminal P14. Therefore, when the output of the reception clock output terminal P13 of a certain PHY 3 is fixed at a certain level (for example, a high level), the relay device 2 can no longer receive a date from another communication device connected to the PHY 3.

Hereinafter, for convenience, when the reception clock signal and the transmission clock signal are not distinguished from each other, they are referred to as clock signals. Further, when the transmission clock output terminal P11 and the reception clock output terminal P13 are not distinguished, they are simply described as clock output terminals. In general, a plurality of types of clock signals such as a system clock is present in the relay device 2, but the clock signals here indicate clock signals for operating the transmission controller 411 and the reception controller 412 of the MAC 41. The PHY 3 that outputs the clock signal corresponds to the clock output source.

The clock monitor 42 is configured to detect the fixing of the transmission clock signal and the reception clock line. The clock monitor 42 of the present embodiment includes a transmission clock monitor (TX CLK MNT) 421 and a reception clock monitor (RX CLK MNT) 422 as a finer configuration.

The transmission clock monitor 421 is configured to receive the output signal of the transmission clock output terminal P11. For example, the transmission clock monitor 421 is electrically connected to the transmission clock line Ln1. The transmission clock monitor 421 sequentially monitors a voltage applied to the transmission clock line Ln1 and detects a stop of the transmission clock signal. Sequentially monitoring the voltage applied to the transmission clock line Ln1 corresponds to sequentially monitoring the signal input to the transmission clock input terminal P21 of the MAC 41 and the signal output from the transmission clock output terminal P11 of the PHY 3.

Figure 4:
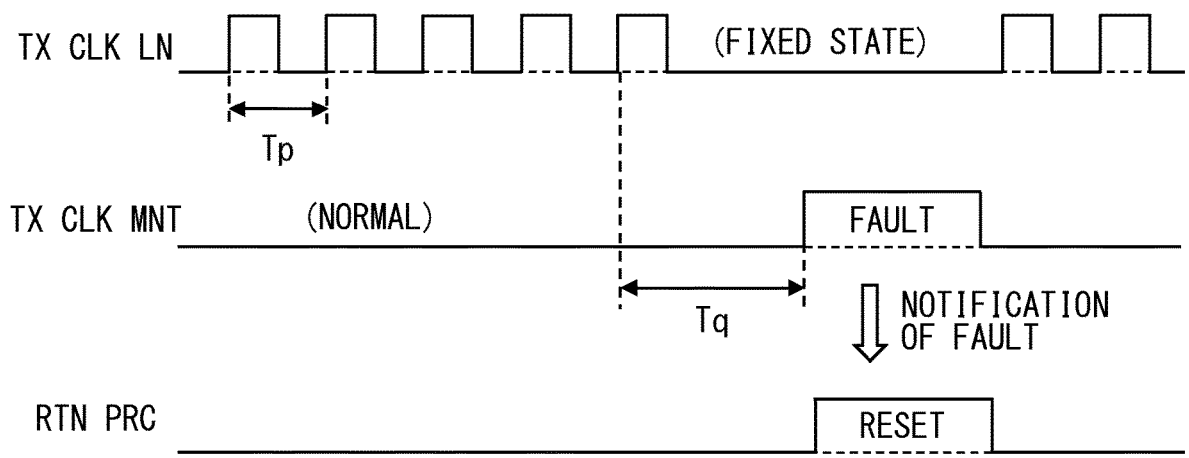
FIG. 4 is a diagram for explaining the operation of the clock monitor.

The transmission clock monitor 421 determines that the PHY 3 is operating normally based on a periodic input of the pulse signal from the transmission clock output terminal P11. Further, the transmission clock monitor 421 detects a fault operation of the PHY 3 based on a fact that the periodic pulse signal is no longer input from the transmission clock output terminal P11. For example, as shown in FIG. 4, the transmission clock monitor 421 determines that the transmission clock line is fixed when a rising edge is not observed for a predetermined standby time Tq or more. The state in which the transmission clock line is fixed corresponds to a state in which the output of the transmission clock output terminal P11 is fixed at a certain level such as a high level or a low level. Determining that the transmission clock line is fixed corresponds to detecting a fixing of the transmission clock line.

The standby time Tq, which is a parameter for determining that the transmission clock line is fixed, may be set to, for example, four times a rising edge interval Tp in a case where the PHY 3 is operating normally. A specific value of the standby time Tq may be appropriately designed. The standby time Tq may be set to a value longer than the rising interval Tp of the pulse signal. The case where the rising edge of the transmission clock signal is not observed for the predetermined standby time Tq or more means that the transmission clock signal remains at a constant level (for example, the high level or the low level) for the predetermined standby time Tq or more.

When the transmission clock monitor 421 detects that the transmission clock line is fixed, the transmission clock monitor 421 outputs a fault notification data to the microcomputer 5. The fault notification data is data indicating that the transmission clock line of the PHY 3 to be monitored is fixed. It is preferable that the fault notification data includes information indicating which of the plurality of PHYs 3 included in the relay device 2 has the fixing of the clock line. In the present embodiment, as an example, a unique identification number (hereinafter, PHY number) is set in advance for each PHY 3 provided in the relay device 2, and the transmission clock monitor 421 is configured to notify of the PHY number of the PHY 3 whose clock line is fixed. The PHY 3 whose clock line is fixed refers to the PHY 3 in which the output level of the clock output terminal is fixed to a certain level.

The return processor 51 of the microcomputer 5 outputs a reset signal to the PHY 3 whose clock line is fixed, based on the fault notification data input from the transmission clock monitor 421. In this way, the microcomputer 5 outputs the reset signal to the PHY 3 detected not to be operating normally by the clock monitor 42, thereby restarting the PHY 3. Accordingly, the PHY 3 whose clock line is fixed is returned to the normal state. The output process of the reset signal is an example of a process performed by the return processor 51 in order to normalize the operation of the PHY 3. The content of the process performed by the return processor 51 to normalize the operation of the PHY 3 is not limited to the above example. The details of the operation mode of the return processor 51 will be described later.

The reception clock monitor 422 is configured to sequentially monitor a voltage applied to the reception clock line Ln2 to detect the fixing of the reception clock line. The reception clock monitor 422 is configured to receive the output signal of the reception clock output terminal P13. For example, the reception clock monitor 422 is electrically connected to the reception clock line Ln2. Sequentially monitoring the voltage applied to the reception clock signal line Ln2 corresponds to sequentially monitoring the signal input to the reception clock input terminal P23 of the MAC 41 and the signal output from the reception clock output terminal P13 of the PHY 3.

The method by which the reception clock monitor 422 detects the fixing of the reception clock line can be the same as the method by which the transmission clock monitor 421 detects the fixing of the transmission clock line. That is, the reception clock monitor 422 determines that the reception clock signal is stopped when the rising edge is not observed for the predetermined standby time Tq or more. When the reception clock monitor 422 determines that the reception clock line is fixed, the reception clock monitor 422 outputs a fault notification data to the microcomputer 5. The content of the fault notification data is similar to the fault notification data output by the transmission clock monitor 421.

The transmission clock monitor 421 and the reception clock monitor 422 may be configured to determine that the PHY 3 is operating abnormally also when the interval between the rising edges of the clock signal is too short or too long. Hereinafter, when the transmission clock monitor 421 and the reception clock monitor 422 are not distinguished from each other, they are simply referred to as the clock monitor 42.

Figure 5:
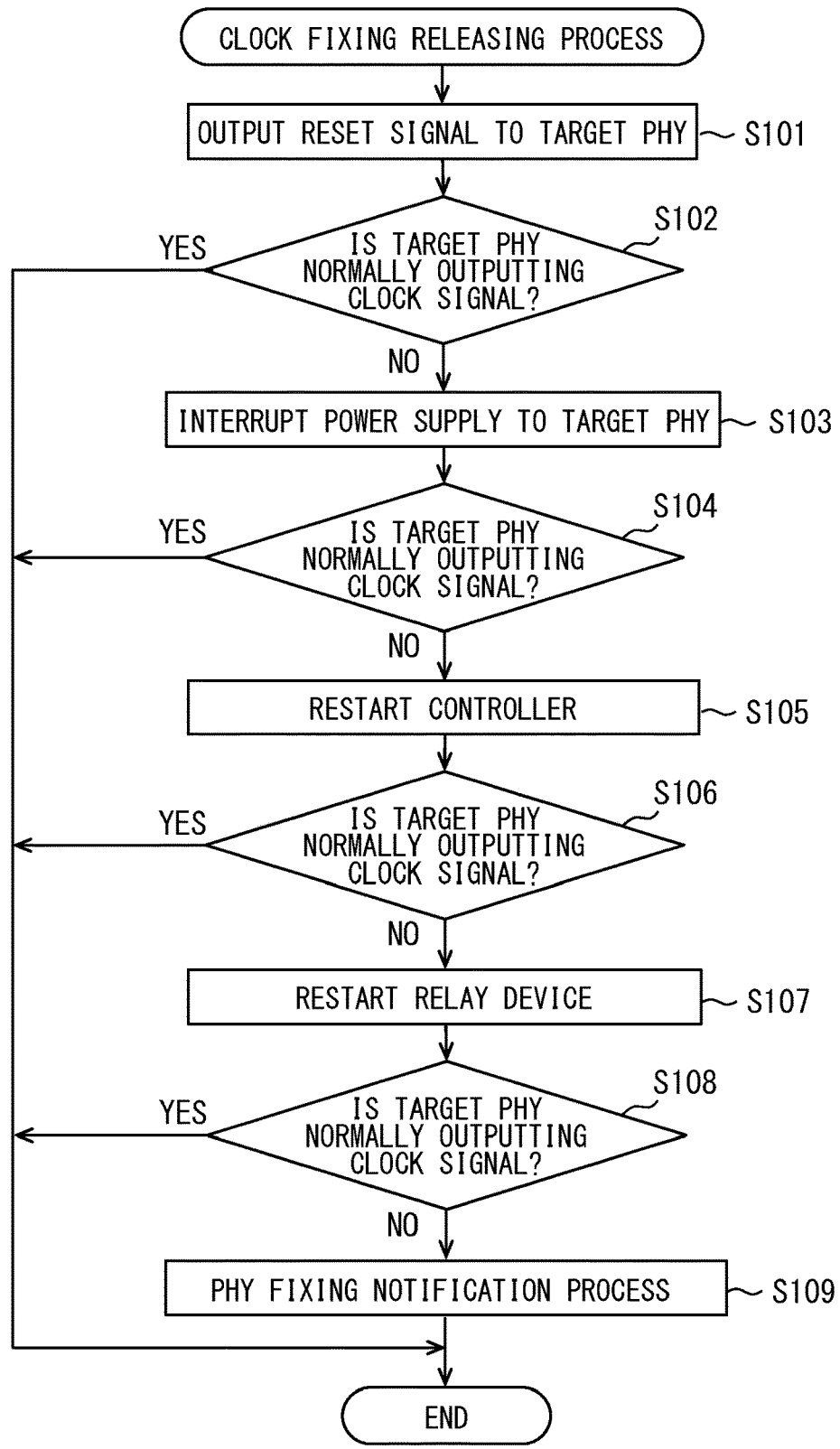
FIG. 5 is a flowchart showing an example of a clock fixing releasing process.

Here, the clock fixing releasing process performed by the return processor 51 in cooperation with the clock monitor 42 and the like will be described using the flowchart shown in FIG. 5. The clock fixing releasing process is a process for returning the PHY 3 whose clock signal is fixed to the normal state. The return processor 51 executes the clock fixing releasing process based on the input of the fault notification data from the clock monitor 42. The clock fixing releasing process of the present embodiment includes S101 to S109 as an example. The conditions under which the return processor 51 executes the clock fixing releasing process can be changed as appropriate. For example, the return processor 51 may be configured to execute the clock fixing releasing process when the stop of the clock signal is detected a plurality of times in the same PHY 3 within a certain time.

First, in S101, the return processor 51 outputs the reset signal to the PHY 3 for which the fixing of the clock line is detected (hereinafter, the target PHY). The target PHY may be specified by, for example, the PHY number included in the fault notification data. When the process in S101 is completed and the predetermined PHY starting time elapses, S102 is executed. The PHY starting time is an estimated value of a time required for restarting the PHY 3. The specific value of the PHY starting time may be appropriately designed.

In the present embodiment, as an example, it is assumed that the reset signal is directly input from the microcomputer 5 to the target PHY, but the present embodiment is not limited to this. The microcomputer 5 may be configured to instruct the controller 4 to reset the target PHY, and the controller 4 may be configured to reset the target PHY based on the instruction from the microcomputer 5.

In S102, the clock monitor 42 corresponding to the target PHY determines whether the target PHY is normally outputting the clock signal. The clock monitor 42 corresponding to the target PHY is the clock monitor 42 configured to monitor the clock signal output from the target PHY among the plurality of clock monitors 42. In other words, the clock monitor 42 connected to the clock output terminal of the target PHY corresponds to the clock monitor 42 corresponding to the target PHY.

The determination of whether the target PHY is normally outputting the clock signal may be performed in the same manner as the determination of whether the clock line is fixed. When it can be confirmed that the target PHY is normally outputting the clock signal, S102 is affirmatively determined and this flow ends. On the other hand, when the target PHY is not normally outputting the clock signal, that is, when the clock line of the target PHY is still fixed, S102 is negatively determined and S103 is executed.

In S103, the return processor 51 cooperates with the power supply circuit 6 to temporarily interrupt the power supply to the target PHY, thereby restarting the target PHY in terms of hardware (that is, hardware rebooting). Specifically, the return processor 51 outputs a control signal to the power supply circuit 6 to interrupt the power supply to the target PHY. Then, after the lapse of the predetermined time, the return processor 51 outputs a control signal for supplying power to the target PHY to the power supply circuit 6. When the process in S103 is completed, S104 is executed.

In S104, in a manner similar to S102, the clock monitor 42 corresponding to the target PHY determines whether the target PHY is normally outputting the clock signal. When it can be confirmed that the target PHY is normally outputting the clock signal, S104 is affirmatively determined and this flow ends. On the other hand, when the target PHY is not normally outputting the clock signal, S104 is negatively determined and S105 is executed.

In S105, the return processor 51 restarts the controller 4 and proceeds to S106. In S106, in a manner similar to S102, the clock monitor 42 corresponding to the target PHY determines whether the target PHY is normally outputting the clock signal. When it can be confirmed that the target PHY is normally outputting the clock signal, S106 is affirmatively determined and this flow ends. On the other hand, when the target PHY is not normally outputting the clock signal, S106 is negatively determined and S107 is executed.

In S107, the return processor 51 restarts the relay device 2 including the microcomputer 5 and proceeds to S108.

Hereinafter, for convenience, restarting the relay device 2 will also be referred to as a device restart.

In S108, in a manner similar to S102, the clock monitor 42 corresponding to the target PHY determines whether the target PHY is normally outputting the clock signal. When it can be confirmed that the target PHY is normally outputting the clock signal, S108 is affirmatively determined and this flow ends. On the other hand, when the target PHY is not normally outputting the clock signal, S108 is negatively determined and S109 is executed.

In S109, the return processor 51 executes the PHY fixing notification process. The PHY fixing notification process is a process of notifying the user or an external device of a fault in the PHY 3 (specifically, the fixing of the clock line). The PHY fixing notification process corresponds to a process of notifying that a fault has occurred in the clock signal for operating the MAC 41. For example, as the PHY fixing notification process, the return processor 51 cooperates with a wireless communication device (not shown) to notify a center, which manages the vehicle, that a fault has occurred in the PHY 3 of the relay device 2. Alternatively, as the PHY fixing notification process, the return processor 51 notifies via a display, an indicator, a speaker, or the like that a fault has occurred in the communication network constructed in the vehicle. When the processing in S109 is completed, this flow ends.

In the above-described configuration, for example, when the clock line of the PHY 3 connected to the communication cable 9 is fixed due to the influence of noise superimposed on the communication cable 9, the clock monitor 42 detects the occurrence of the fixing, and the recovery processor 51 restarts the target PHY. According to such a configuration, the relay device 2 can automatically return the target PHY to the normal state. Further, even when the clock line of the PHY 3 is fixed, it is not necessary for a user such as a driver to restart the relay device 2 by a manual operation.

In addition, in the above embodiment, as the clock fixing releasing process, the target PHY is attempted to be normalized by individually restarting only the target PHY (S101, S103). According to such a configuration, even while the target PHY is restarted, the communication between the devices via the other PHY 3 for which the fixing of the clock line is not detected is continued. Therefore, the influence on the in-vehicle communication system 100 can be reduced as compared with the case where the device restart is executed.

In addition, as a method for individually restarting only the target PHY, two methods, that is, restart by a reset signal and restart by interrupting and turning on the power, are tried. As described above, according to the configuration in which the target PHY is restarted by a plurality of approaches, the possibility that the target PHY returns to the normal state can be increased.

By the way, when the device restart is executed, the function provided by the relay device 2 (for example, the relay function of the communication frame) is temporarily stopped. As a matter of course, when the relay function by the relay device 2 is stopped, the plurality of ECUs 1 connected to the relay device 2 cannot communicate with other ECUs 1. That is, it affects the communication between the ECUs 1. Therefore, there is a circumstance that it is desired to avoid restarting the relay device 2 as much as possible while the vehicle is running.

In response to such a situation, in the above configuration, before executing the device restart as S107, first, the target PHY is attempted to be normalized by restarting only the target PHY (S101, S103). Then, when the fixing of the clock line is released by the individual restart of the target PHY, the device restart is not executed. In this way, according to the configuration in which the device is restarted as a preliminary means after attempting to normalize the target PHY by restarting only the target PHY, the frequency of restarting the entire device in order to release the fixing of the clock line can be suppressed. Although the present embodiment describes an example in which the return processor 51 executes S101 to S109 as the clock fixing releasing process, the present disclosure is not limited to the above example. The clock fixing releasing process may be only S101 or only S103. The clock fixing releasing process may also be only S107. The content of the clock fixing releasing process can be changed as appropriate.

While the embodiment of the present disclosure has been described above, the present disclosure is not limited to the embodiment described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is referred to, the configuration of the embodiment described above can be applied to other parts.

First Modification

Figure 6:
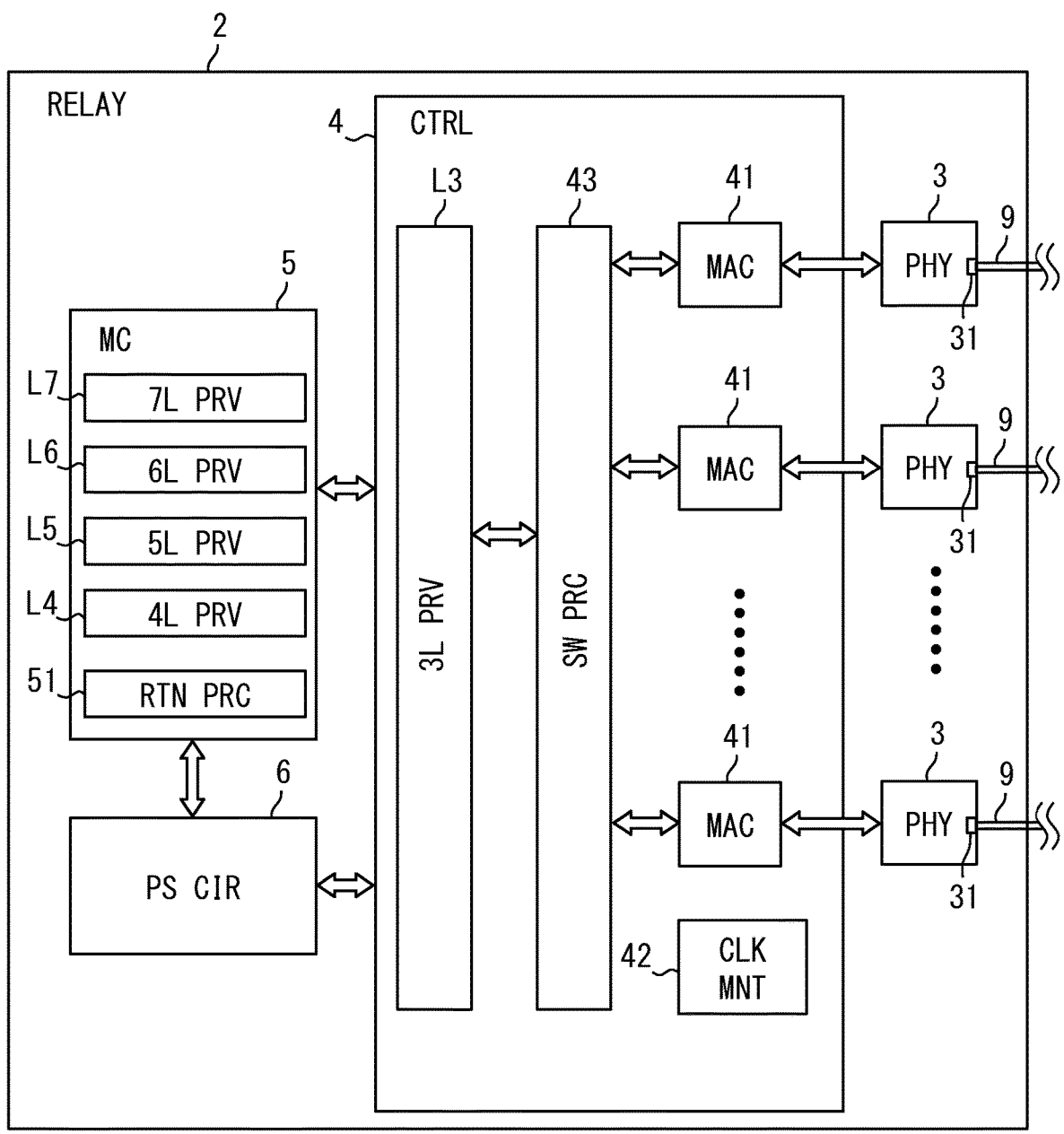
FIG. 6 is a block diagram showing a modification of a configuration of a relay device.

In the above-described embodiment, the configuration in which the clock monitor 42 is individually provided for each of the plurality of MACs 41 is disclosed, but the present disclosure is not limited to this configuration. One clock monitor 42 may be configured to monitor clock signals input to the plurality of MACs 41. In other words, as shown in FIG. 6, the plurality of clock monitors 42 may be integrated into one module.

Second Modification

Figure 7:
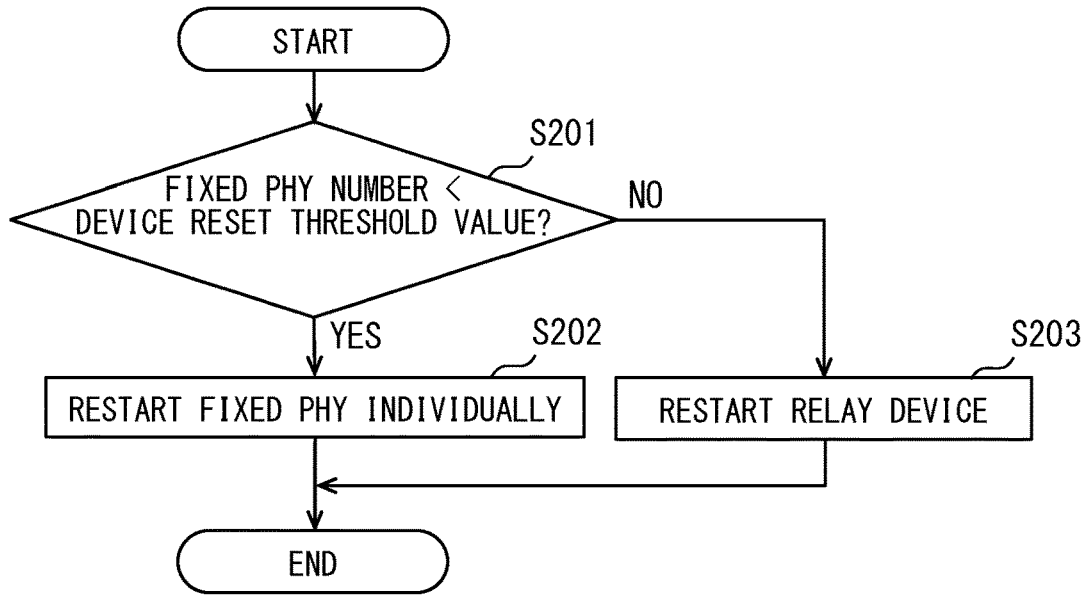
FIG. 7 is a flowchart for explaining a modification of an operation mode of the return processor.

The return processor 51 may also be configured to identify the number of PHYs 3 whose clock line is fixed (hereinafter, the number of fixed PHYs) based on the notification from the clock monitor 42, and change the content of the action to be executed as the clock fixing releasing process. For example, the return processor 51 determines whether the number of fixed PHYs is less than a predetermined device reset threshold value, as shown in FIG. 7 (S201). Then, when the number of fixed PHYs is less than the device reset threshold value, the PHYs 3 in which the clock fixing occurs are individually restarted (S202). As a means for individually restarting the PHYs as S202, a reset signal input, power supply control, or the like can be adopted. The process of S202 corresponds to an individual restart process. On the other hand, when the number of fixed PHYs is equal to or higher than the predetermined device reset threshold value (NO in S201), the relay device 2 is restarted (S203).

The device reset threshold value may be set to a value of 2 or more, for example, 2, 3, 4, or 5. For example, the device reset threshold is set to 2. According to such a setting mode, when the number of fixed PHYs is one, the PHY 3 alone is restarted, while when the number of fixed PHYs is plural, the entire relay device 2 is restarted (S203).

As a cause of clock fixing in the PHY 3, for example, noise superimposed on the communication cable 9 connected to the PHY 3 can be considered. If clock fixing occurs due to noise superimposed on the communication cable 9, it is expected that the number of PHYs 3 in which clock fixing is observed will be one. This is because the communication cables 9 are provided in different modes, and the noise superimposition mode is also different for each communication cable 9. Therefore, when clock fixing occurs in a plurality of PHYs 3 at the same time, paradoxically, there is a high possibility that the cause of the clock fixing is not caused by noise superimposed on the communication cable 9, but a fault occurs in the device itself.

The present modification is created from the above-described point of view, and the return processor 51 of the present modification executes the action according to the cause of the clock fixing. Therefore, it is possible to return the relay device 2 to the normal state more quickly. From another point of view, the device reset threshold value corresponds to a parameter for distinguishing whether the clock fixing is caused by noise superimposed on the communication cable or the device itself has a fault. The above control mode corresponds to a mode in which when the number of fixing PHYs is less than the device reset threshold value, the cause of clock fixing is regarded as noise superimposed on the communication cable and the clock fixing releasing process is executed.

Third Modification

As described above, when the relay device 2 is restarted, the ECUs 1 connected to the relay device 2 cannot communicate with the other ECUs 1 until the start of the relay device 2 is completed. Therefore, if the relay device 2 is connected to the ECU 1 that controls the traveling of the vehicle, such as the ECU 1 that provides the autonomous driving function, it is not preferable to execute the device restart. It is preferable that the return processor 51 is configured to execute the device restart only in a situation where the relay function of the relay device 2 is stopped, such as when the vehicle is stopped.

Figure 8:
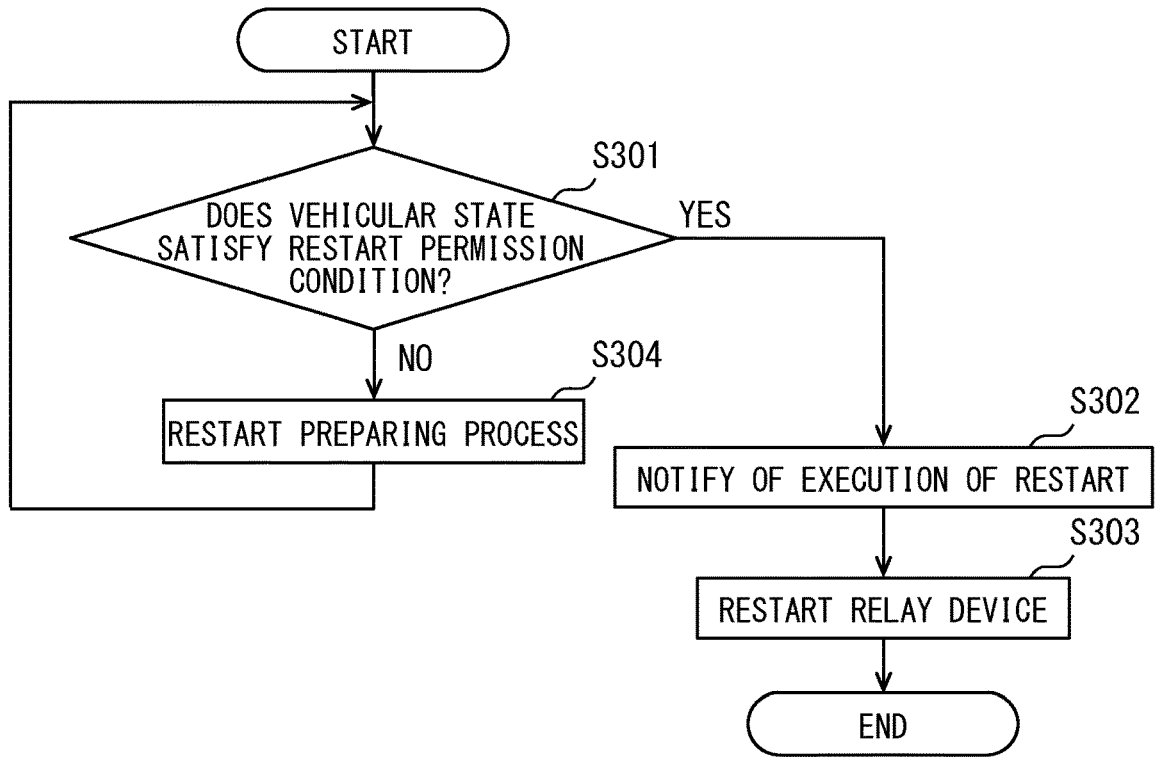
FIG. 8 is a flowchart for explaining another modification of an operation mode of the return processor.

The present modification is created based on the above-described technical idea, and the return processor 51 of the present modification operates according to the flowchart shown in FIG. 8 in the case where it becomes necessary to restart the entire device. The case where it becomes necessary to restart the entire device is, for example, the case where S106 in FIG. 5 is negatively determined and the process proceeds to S107, or the case where S201 in FIG. 7 is negatively determined and the process proceeds to S203.

The return processor 51 of the present modification determines whether the current state of the vehicle satisfies a predetermined restart permission condition based on the vehicle information provided from various ECUs 1 mounted on the vehicle in which the relay device 2 is used (S301). The return processor 51 that executes S301 corresponds to a vehicle state determiner.

The vehicle information here refers to, for example, a vehicle speed, a shift position, an on-off of a parking brake, a current position of the vehicle, a depressed state of a brake pedal, and the like. The restart permission condition is a condition for the return processor 51 to execute the device restart. The restart permission condition is set in advance. For example, the restart permission condition is that the vehicle speed is 0 km/h and the shift position is set to the parking position. According to such a setting, the return processor 51 will execute the device restart while the vehicle is stopped with the shift position set to the parking position.

When the state of the vehicle satisfies the restart permission condition (YES in S301), the return processor 51 notifies the ECU 1 and other relay devices 2 connected to the relay device 2 of execution of the device restart (S302). Then, the return processor 51 executes the device restart (S303).

On the other hand, if the current state of the vehicle does not satisfy the restart permission condition (NO in S301), the execution of the device restart is suspended and a restart preparation process is executed (S304). For example, the return processor 51 proposes to the driver to drive the vehicle to an escape area, or instructs the autonomous driving ECU to stop in the escape area. The restart preparation process is a process for shifting the state of the vehicle to a state that satisfies the predetermined restart permission condition. The specific content of the restart preparation process may be appropriately designed according to the content of the restart permission state.

According to the above configuration, the relay device 2 does not suddenly restart while the vehicle is running. Since the restart is executed after the predetermined restart permission condition is satisfied, it is possible to suppress the influence on the communication between the ECUs 1 and the influence on the running control of the vehicle. The restart permission condition may include that the current position of the vehicle is in a predetermined escape area. The escape area is a place where the vehicle can stop without interrupting other traffic. The escape area includes, for example, an emergency parking zone, which is a space provided on a shoulder of a road so that a broken vehicle, an emergency vehicle, a road management vehicle, and the like can stop and a passing space that is a space for vehicles to pass each other. Whether the vehicle is in the escape area may be specified by using a positioning result by a global navigation satellite system (GNSS) receiver and a map data including information of the escape area.

Fourth Modification

The return processor 51 may also be configured not to execute the clock fixing releasing process when the microcomputer 5 or the controller 4 is executing a specific process in which the clock signals of the PHYs 3 can be stopped. When the specific process in which the clock signals of the PHYs 3 can be stopped is being executed is, for example, when the microcomputer 5 is being started, when the controller 4 is being reprogrammed, when the PHYs 3 are intentionally stopped, or when the PHYs 3 are being started. According to the above-described configuration, when the clock signal is stopped due to a factor other than a fault in the PHYs 3, the clock fixing releasing process is not executed. That is, it is possible to suppress the unnecessary execution of the clock fixing releasing process.

Fifth Modification

The arrangement mode of each function described above is an example and can be changed as appropriate. For example, the return processor 51 may be included in the controller 4 or may be included in the clock monitor 42. The return processor 51 may be realized by the cooperation between the controller 4 and the microcomputer 5. Further, the clock monitor 42 may be provided in the microcomputer 5. The MACs 41 may be realized as chips independent of the controller 4.

Sixth Embodiment

The present disclosure is applied to the relay devices 2 in the above-described embodiment, but the present disclosure may also be applied to other vehicular communication devices such as the ECUs 1. The vehicular communication devices here refer to vehicular devices configured to enable communication conforming to the Ethernet standard. For example, various ECUs 1, the relay devices 2, peripheral monitoring sensors such as an object recognition device, and the like can correspond to vehicular communication devices.

The restart permission condition for the ECU 1 that provides the autonomous driving function may be set, for example, that the vehicle is stopped or that the driving authority is transferred to the driver. Further, it is preferable that the restart permission condition for the ECU 1 that controls the running of the vehicle includes that the vehicle is stopped. According to such a setting, the restart of the ECU 1 is suspended until the vehicle is stopped, and the possibility of affecting the running control can be reduced. It is preferable that each of the ECUs 1 is configured so that the restart is not executed during execution of a software update. That is, it is preferable that the restart permission condition includes that the software update is not in progress. If a restart is required during the software update, it is preferable that the update process is executed after saving data related to the update from the beginning or the middle of the update process, as the restart preparation process.

Seventh Modification

In the above-described embodiment, the configuration in which the PHYs 3 and the MACs 41 are configured to communicate with each other by MII has been disclosed, but the present disclosure is not limited to this configuration. The PHYs 3 and the MACs 41 may also be configured to communicate with each other by reduced MII (RMII), reduced gigabit MII (RGMII), or the like.

Means and/or functions provided by the relay device 2 may be provided by software recorded in a substantive memory device and a computer that can execute the software, software only, hardware only, or some combination of them. Some or all of the functions of the relay device 2 may be realized as hardware. A configuration in which a certain function is realized as hardware includes a configuration in which the function is realized by use of one or more ICs or the like. For example, when a part of the functions or all of the functions of the vehicle relay device 2 is provided by an electronic circuit being hardware, it may be possible to provide it by a digital circuit including multiple logic circuits or analog circuits. The same applies to the means and/or functions provided by the ECU 1.

What is claimed is:

1. A vehicular communication device configured to perform communication in accordance with an Ethernet standard, comprising:
   a medium access controller (MAC) configured to execute medium access control;
   a clock monitor configured to monitor a clock signal for operating the MAC;
   a return processor configured to restart a clock output source that outputs the clock signal, in response to the clock monitor detecting that the clock signal is stopped; and
   a plurality of physical layers (PHYs), wherein
   the MAC is one of a plurality of MACs corresponding to the PHYs, respectively,
   each of the PHYs is configured to operate as the clock output source and output the clock signal to corresponding one of the MACs,
   the clock monitor is further configured to monitor the clock signal output by each of the PHYs, and
   the return processor is further configured to individually restart the PHYs for which the clock monitor detects that an output of the clock signal is stopped in a case where a number of the PHYs for which the clock monitor detects that the output of the clock signal is stopped is less than a predetermined device reset threshold value.

2. The vehicular communication device according to claim 1, wherein
   the return processor is further configured to restart the PHY for which the clock monitor detects that an output of the clock signal is stopped.

3. The vehicular communication device according to claim 1, wherein
   the return processor is further configured to reset the vehicular communication device in a case where a number of the PHYs for which the clock monitor detects that an output of the clock signal is stopped is equal to or greater than a predetermined device reset threshold value.

4. The vehicular communication device according to claim 1, wherein
   the return processor is further configured to:
      output a reset signal to a target PHY to restart the target PHY, the target PHY being the PHY for which the clock monitor detects that an output of the clock signal is stopped; and
      temporarily interrupt power supply to the target PHY to restart the target PHY in a case where the output of the clock signal by the target PHY is still stopped even after restarting the target PHY based on the reset signal.

5. The vehicular communication device according to claim 1, wherein
   the return processor is further configured to:
      execute an individual restart process for individually restarting a target PHY that is the PHY for which the clock monitor detects that an output of the clock signal is stopped; and
      restart the vehicular communication device in a case where the output of the clock signal by the target PHY is still stopped even after executing the individual restart process.

6. The vehicular communication device according to claim 3, wherein
   the return processor is further configured to:
      determine whether a current state of a vehicle in which the vehicular communication device is used is in a state where restarting of the vehicular communication device is permitted; and
      suspend restarting of the vehicular communication device when the return processor determines that the current state of the vehicle is not in the state where restarting of the vehicular communication device is permitted.

7. The vehicular communication device according to claim 3, wherein
   the vehicular communication device is configured as an electronic control unit (ECU) that is configured to perform a running control of a vehicle in which the ECU is used, and the return processor is further configured to suspend restarting of the ECU until the vehicle is stopped in a case where necessity of restarting the ECU arises during running of the vehicle.

8. The vehicular communication device according to claim 3, wherein
the vehicular communication device is configured as an electronic control unit (ECU) that is configured to provide an autonomous driving function of a vehicle in which the ECU is used, and
the return processor is further configured to suspend restarting of the ECU until a driving authority is transferred to a driver in a case where necessity of restarting the ECU arises during running of the vehicle, and restart the ECU after the driving authority is transferred to the driver.

9. A vehicular communication device configured to perform communication in accordance with an Ethernet standard, comprising:
a medium access controller (MAC) configured to execute medium access control;
a clock monitor configured to monitor a clock signal for operating the MAC;
a processer;
a memory storing a program configured to, when executed by the processor, cause the processor to restart a clock output source that outputs the clock signal, in response to the clock monitor detecting that the clock signal is stopped; and
a plurality of physical layers (PHYs), wherein
the MAC is one of a plurality of MACs corresponding to the PHYs, respectively,
each of the PHYs is configured to operate as the clock output source and output the clock signal to corresponding one of the MACs,
the clock monitor is further configured to monitor the clock signal output by each of the PHYs; and
the program is further configured to, when executed by the processor, cause the processor to individually restart the PHYs for which the clock monitor detects that an output of the clock signal is stopped in a case where a number of the PHYs for which the clock monitor detects that the output of the clock signal is stopped is less than a predetermined device reset threshold value.

* * * * *